L. L. MOE.

AUTOMOBILE HOTEL.

APPLICATION FILED JAN. 21, 1922.

Reissued Apr. 11, 1922.

15,333.

3 SHEETS—SHEET 1.

Inventor

Leonidas L. Moe

By A. J. O'Brien

Attorney

L. L. MOE.

AUTOMOBILE HOTEL.

APPLICATION FILED JAN. 21, 1922.

Reissued Apr. 11, 1922.

15,333.

3 SHEETS—SHEET 2.

Inventor
Leonidas L. Moe

By A. J. O'Brien

Attorney

L. L. MOE.

AUTOMOBILE HOTEL.

APPLICATION FILED JAN. 21, 1922.

Reissued Apr. 11, 1922.

15,333.

3 SHEETS—SHEET 3.

Inventor
Leonidas L. Moe

By A. J. O'Brien
Attorney

UNITED STATES PATENT OFFICE.

LEONIDAS L. MOE, OF DENVER, COLORADO, ASSIGNOR TO THE MOTOR HOTELS COMPANY, OF DENVER, COLORADO, A CORPORATION OF COLORADO.

AUTOMOBILE HOTEL.

Specification of Reissued Letters Patent. Reissued Apr. 11, 1922.

15,333.

Original No. 1,395,969, dated November 1, 1921. Serial No. 372,596, filed April 9, 1920. Application for reissue filed January 21, 1922. Serial No. 530,976.

*To all whom it may concern:*

Be it known that I, LEONIDAS L. MOE, a citizen of the United States, residing at the city and county of Denver, State of Colorado, have invented certain new and useful Improvements in Automobile Hotels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a structure which will house a large number of automobiles during business hours particularly, with the chief object of relieving the streets of cars parked at the curb, which is now becoming to be the great problem in all the large cities. In this way, those whose cars remain idle for several hours at a time may place them in a safe place, and at the same time free the curb for those who intend to park their cars for only a few minutes.

Briefly, the invention comprises a building which may be rounded at its corners and which has inclined driveways at opposite sides. On the right side the inclined drives are for the purpose of going up, and on the opposite side for the purpose of coming down. Stalls or rooms are provided between these inclined driveways, and main driveways are also provided along the level floor for the passage of cars from one inclined drive to another. Between certain of the rows of stalls, driveways are provided which are limited to the use of those using the stalls opening thereon.

Elevators are also provided for the carrying of passengers to and from their respective floors.

Figure 2:
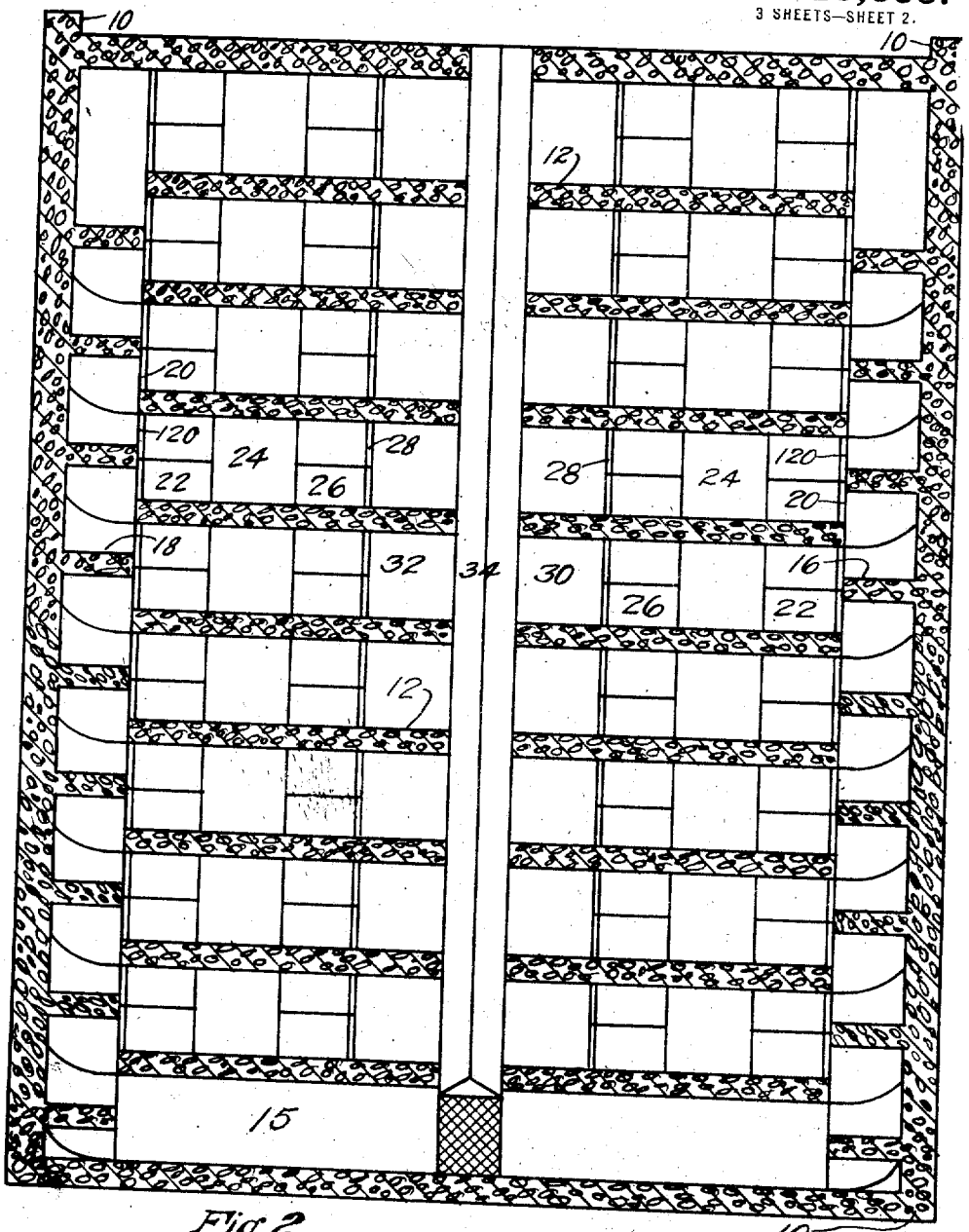
Fig. 2 is a cross section on line 2—2 of Fig. 1.
Figure 3:
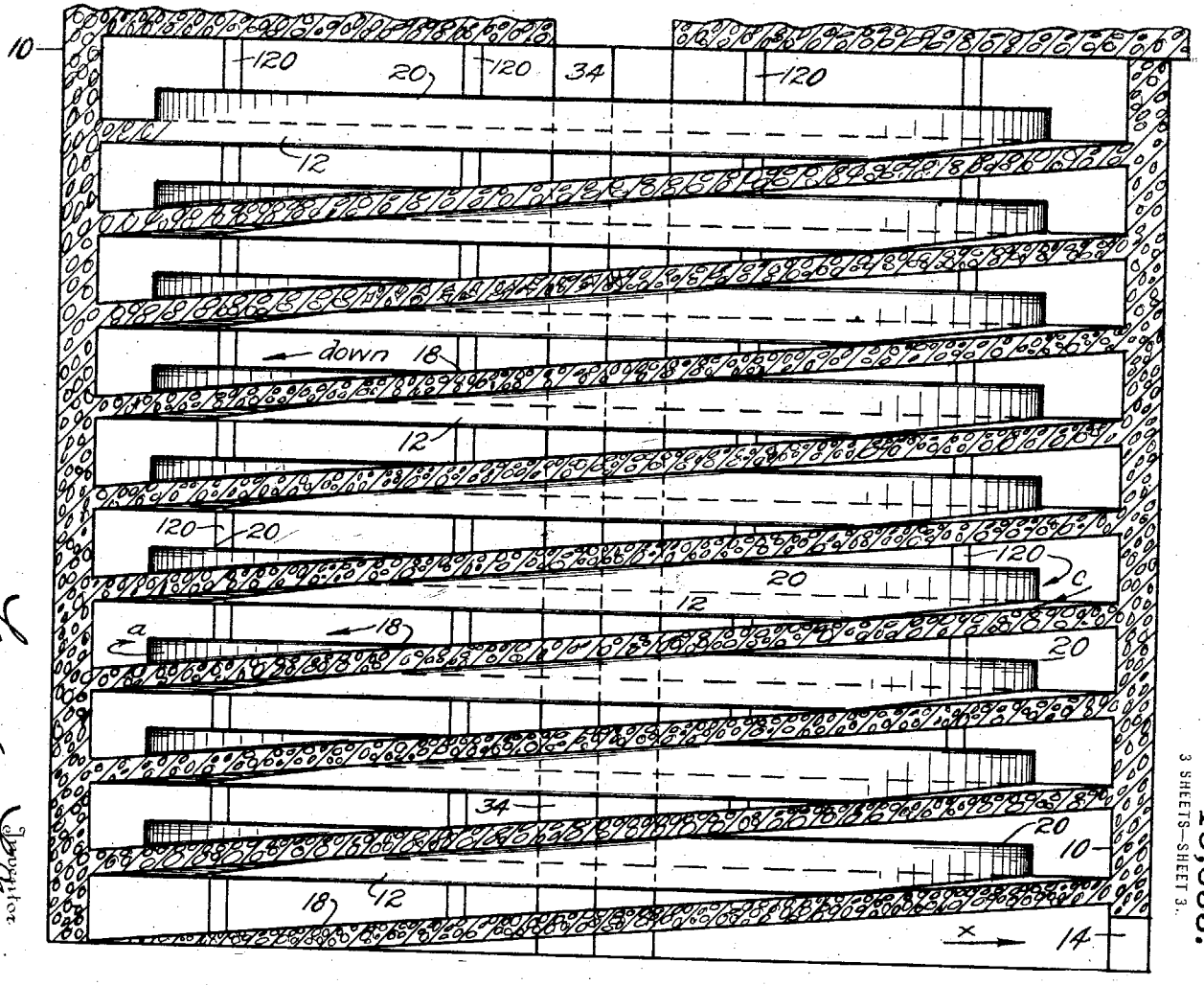
Fig. 3 is a longitudinal vertical section indicated by line 3—3 of Fig. 1.

The building is provided, as usual, with walls 10 and floors 12. One end of the building is provided on the first floor with a door or series of doors 14, for entrance and exit. If desired, the lower floor, represented at 15 in Fig. 2, may be reserved for offices, filling stations, repair shops and supply booths.

The floors are connected on the right side by inclined driveways 16, for the use of incoming cars. On the left side, inclined driveways 18 are provided for the use of outgoing cars coming from the upper floors. Walls 20, with suitable pillars 120, may be provided on the inside of the drives 16 and 18, and along these walls 20 a plurality of stalls or rooms 22 are arranged. These are separated by drives 24 on the floors 12 from a second series of stalls 26, provided on their ends opposite the drives 24 with walls 28. The spaces 24 are reserved for the use of the cars using the adjacent stalls 22 and 26. Running along the outer side of the right wall 28 is a main drive 30, leading from the front of the building to the rear, so that cars coming up on one inclined drive 16 from the lower floor, as indicated by arrow A, may pass in the direction of arrows B, to the inclined drive 16 at the opposite end of the building, where they may move up to the next floor, as indicated.

On the opposite side, adjacent the left wall 28, a similar drive 32 is provided for the use of cars coming down from the upper floors, as indicated by the arrow *a*, these cars moving in the direction of the arrow *b* to the front of the building, and then going down the next inclined drive 18, as shown.

The ways 30 and 32 are separated by a series of elevators 34, for carrying passengers up and down, and also by a series of stalls 36, which may open on both ends so that they may use either of the ways 30 or 32.

Figure 1:
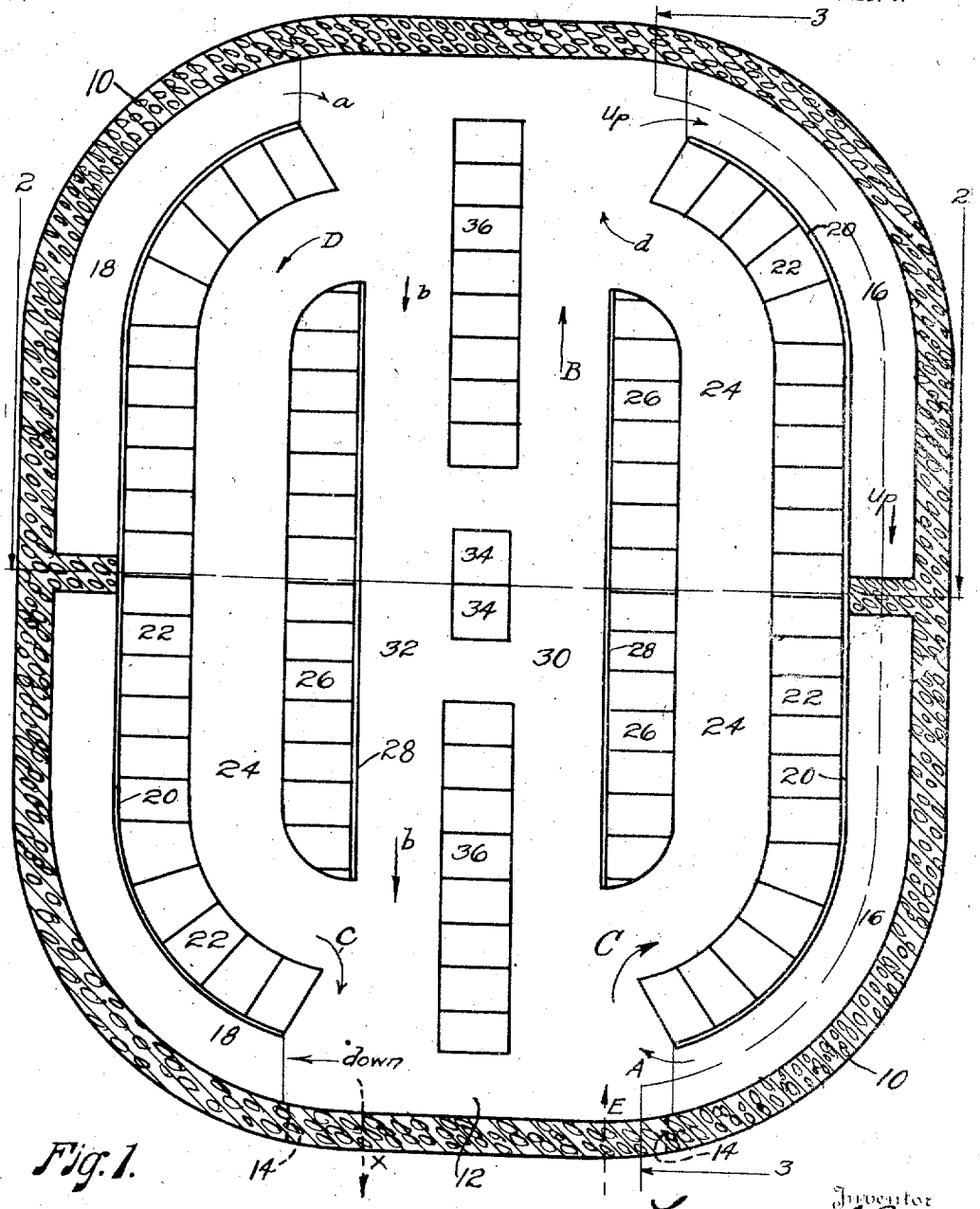
Figure 1 is a plan view of one of the floors with its stalls and drives.

Entrance of a car through the doorways 14 on the main floor is indicated in Fig. 1 by the arrow E. The car will pass to the rear of the building and up the inclined driveway 16 to the second floor, leaving said drive in the direction indicated by arrow A. If the car is going to a floor above, it will follow the arrows B to the rear of the building again, and then up the next inclined driveway 16 and so on, until it reaches its floor. If the car is to park in one of the right-hand stalls 22 or 26, it will, after entering the floor as indicated by arrow A, turn into the adjacent driveway 24, as indicated by arrow C. This driveway 24 is reserved for the use of those who are entering or leaving the adjacent stalls. If the entering car is to use one of the stalls on the left, it will follow the arrows B to the opposite end of the building, and then turn to the left and enter the left driveway 24 as indicated by the arrow D.

In leaving a building, the car coming from a floor above in the direction indicated by arrow *a* will pass in the direction of arrows *b* to the front of the building, and down the next inclined driveway 18. A car leaving the stalls on the left will pass from the driveway 24, as indicated by arrow *c* to the adjacent descending way 18. A car which is leaving the right-hand stalls will leave the right-hand driveway 24 as indicated by arrows *d*, move to the end of the building, and then turn to the left and pass through the driveway 32, as indicated by arrows *b*. When they reach the main floor, they will leave from the left of the doorway 14, as indicated by arrow *x*, Fig. 1.

The stalls 36 are used for the purpose of saving space. It will be necessary that these stalls be open at both ends so that they may be entered from either end or vacated from either end. Thus, in the morning hours, when practically all cars are coming in, the driver may use the driveway 32, to get into and out of his stall 36, because there will be few cars leaving through driveway 32 and traffic will not be blocked. At times when most of the traffic is through the drive 32, on the way out of the building, he may use the drive 30 to leave and enter his stall.

From the foregoing it is believed that a structure has been presented which will solve the difficulty of parking cars in business sections during business hours. Not only are cars which are to be parked for a considerable length of time taken off of the street, but the owner has the satisfaction of knowing that his car is in a safe place. Some of the stalls may be in the form of rooms, with locked doors, if desired, so that the owner will be afforded greater protection. At the same time, this affords parking space on the streets for those who desire to park only for a few minutes.

It will be noted that in this manner the cars go up to their respective stalls under their own power, and along set lines of travel, so that there is no interference between cars moving in opposite directions. At the same time cars which are entering or leaving their stalls will not interfere with cars which are passing directly through the respective floor to reach another floor. The users of the stalls may leave their respective floors by means of the elevators 34, and when coming for their cars may be carried to said floors by said elevators.

I claim:

1. A structure for housing motor vehicles, comprising a plurality of floors, inclined drives connecting the floors for the use of incoming cars, separate inclined drives connecting the floors for the use of outgoing cars, all of the said drives being inclined in the same direction, floor drives connecting the inclined drives for incoming cars, and separate floor drives connecting the inclined drives for outgoing cars.

2. A structure for housing motor vehicles, comprising a plurality of floors, inclined drives connecting the floors for the use of incoming cars, inclined drives connecting the floors for the use of outgoing cars all of the said drives being inclined in the same direction, floor drives connecting the inclined drives for incoming cars, separate floor drives connecting the inclined drives for outgoing cars, and stalls arranged adjacent the floor drives.

3. An automobile hotel, comprising a plurality of floors, a series of inclined drives on one side of the building connecting the floors for the use of incoming cars, a separate series of inclined drives on the other side of the building connecting the floors for the use of outgoing cars, the two series being duplicates, and all of the drives of each being inclined in the same direction, and drives provided on the several floors connecting the ends of the inclined drives of the respective series.

4. An automobile hotel, comprising a plurality of floors, a series of inclined drives connecting the floors for the use of incoming cars, a separate series of inclined drives connecting the floors for the use of outgoing cars, one series of drives being on one side of the building and the other series on the other side of the building, level main drives on each floor extending from end to end and connecting the inclined drives of the respective series, the two series being duplicates, and all of the drives of each being inclined in the same direction, and series of stalls arranged adjacent said drives, said stalls having ways adjacent thereto and separate from all of said drives.

In testimony whereof I affix my signature.

LEONIDAS L. MOE.